US00RE50482E

(19) United States
(12) Reissued Patent
Kimura et al.

(10) Patent Number: US RE50,482 E
(45) Date of Reissued Patent: Jul. 8, 2025

(54) PRINTING APPARATUS AND LIQUID STORAGE MEMBER

(71) Applicant: CANON KABUSHIKI KAISHA, Tokyo (JP)

(72) Inventors: Yukimichi Kimura, Kawasaki (JP); Takahiro Kiuchi, Fuchu (JP); Junichi Kubokawa, Kawasaki (JP); Kyohei Sato, Kawasaki (JP); Koki Shimada, Kawasaki (JP); Masaya Shimmachi, Kawasaki (JP); Yusuke Tanaka, Kawasaki (JP); Hideaki Matsumura, Kawasaki (JP); Keiichiro Tsukuda, Yokohama (JP); Tatsuo Nanjo, Kawasaki (JP)

(73) Assignee: Canon Kabushiki Kaisha, Tokyo (JP)

(21) Appl. No.: 17/750,772

(22) Filed: May 23, 2022

Related U.S. Patent Documents

Reissue of:
(64) Patent No.: 10,118,396
Issued: Nov. 6, 2018
Appl. No.: 15/643,225
Filed: Jul. 6, 2017

U.S. Applications:
(60) Continuation of application No. 16/728,460, filed on Dec. 27, 2019, now Pat. No. Re. 49,336, which is an
(Continued)

(30) Foreign Application Priority Data

Oct. 30, 2015 (JP) ..... 2015-214358

(51) Int. Cl.
*B41J 29/377* (2006.01)
*B41J 2/175* (2006.01)
(Continued)

(52) U.S. Cl.
CPC ..... *B41J 29/377* (2013.01); *B41J 2/175* (2013.01); *B41J 2/17509* (2013.01);
(Continued)

(58) Field of Classification Search
CPC . B41J 29/377; B41J 29/02; B41J 29/13; B41J 2/175; B41J 2/17556; B41J 2/17523;
(Continued)

(56) References Cited

U.S. PATENT DOCUMENTS 5,430,471 A 7/1995 Nakajima et al. ..... 347/87
5,448,274 A * 9/1995 Hirabayashi ..... 347/86
(Continued)

FOREIGN PATENT DOCUMENTS

CN 1616233 5/2005
CN 1833870 9/2006
(Continued)

OTHER PUBLICATIONS

Office Action dated Feb. 4, 2020 in counterpart Korean Application No. 10-2019-0143148, together with English Translation thereof.
(Continued)

*Primary Examiner* — Minh Nguyen
(74) *Attorney, Agent, or Firm* — Venable LLP

(57) ABSTRACT

The printing apparatus of the present invention includes: a print head; and a liquid storage container in which a liquid storage chamber that stores a liquid to be supplied to the print head, an atmosphere communication chamber that communicates with the atmosphere, and a communication flow path that causes the liquid storage chamber and the atmosphere communication chamber to communicate are formed integrally. The liquid storage container can take a first posture in which the atmosphere communication chamber is located under the liquid storage chamber in the direction of gravity and a second posture in which the
(Continued)

atmosphere communication chamber and the liquid storage chamber are located side by side in the horizontal direction. In the case where the liquid storage container is in the second posture, the liquid injection portion and the communication flow path are located on the upper side of the liquid storage container.

13 Claims, 9 Drawing Sheets

Related U.S. Application Data application for the reissue of Pat. No. 10,118,396, which is a division of application No. 15/296,876, filed on Oct. 18, 2016, now Pat. No. 9,738,081.

(51) Int. Cl.
*B41J 29/02* (2006.01)
*B41J 29/13* (2006.01)

(52) U.S. Cl.
CPC ..... *B41J 2/17513* (2013.01); *B41J 2/17523* (2013.01); *B41J 2/17553* (2013.01); *B41J 2/17556* (2013.01); *B41J 2/17596* (2013.01); *B41J 29/02* (2013.01); *B41J 29/13* (2013.01)

(58) Field of Classification Search
CPC ..... B41J 2/17553; B41J 2/17509; B41J 2/17513; B41J 2/17596
See application file for complete search history.

(56) References Cited

U.S. PATENT DOCUMENTS 5,504,511 A 4/1996 Nakajima et al. ..... 347/86
5,583,549 A 12/1996 Ujita et al. ..... 347/86
5,589,862 A 12/1996 Ujita et al. ..... 347/87
5,604,523 A 2/1997 Tsukuda et al. ..... 347/86
5,608,437 A 3/1997 Iwata et al. ..... 347/86
5,619,237 A 4/1997 Inoue et al. ..... 347/86
5,781,213 A 7/1998 Ujita et al. ..... 347/86
5,784,088 A 7/1998 Ujita et al. ..... 347/86
5,900,889 A 5/1999 Tsukuda ..... 347/23
5,988,804 A 11/1999 Kotaki et al. ..... 347/87
6,102,533 A 8/2000 Nozawa et al. ..... 347/86
6,152,555 A 11/2000 Nozawa et al. ..... 347/49
6,170,939 B1 1/2001 Ujita et al. ..... 347/86
6,224,201 B1 5/2001 Shigemura ..... 347/93
6,234,615 B1 5/2001 Tsukuda ..... 347/85
6,264,315 B1 7/2001 Nozawa et al. ..... 347/86
6,336,709 B1 1/2002 Inoue et al. ..... 347/49
6,338,546 B1 1/2002 Kotaki et al. ..... 347/49
6,338,551 B1 1/2002 Sato et al. ..... 347/85
6,338,552 B1 1/2002 Sato et al. ..... 347/85
6,361,158 B1 3/2002 Inoue et al. ..... 347/86
6,402,298 B1 6/2002 Nanjo et al. ..... 347/49
6,454,399 B2 9/2002 Ujita et al. ..... 347/86
6,565,199 B2 5/2003 Ujita et al. ..... 347/86
6,702,427 B2 3/2004 Shimizu et al. ..... 347/50
6,712,458 B2 3/2004 Hatasa et al. ..... 347/86
6,783,220 B2 8/2004 Ujita et al. ..... 347/87
6,815,381 B1 11/2004 Yamamoto et al. ..... 442/187
6,824,258 B2 11/2004 Yamamoto et al. ..... 347/86
6,942,325 B2 9/2005 Nanjo ..... 347/86
6,971,741 B2 12/2005 Nanjo et al. ..... 347/85
7,077,514 B2 7/2006 Inoue et al. ..... 347/86
7,104,640 B2 9/2006 Ogura et al. ..... 347/86
7,207,159 B2 4/2007 Nanjo et al. ..... 53/492
7,264,341 B2 9/2007 Katayama ..... 347/86
7,293,865 B2 11/2007 Tsukuda et al. ..... 347/86
7,303,090 B2 12/2007 Nanjo et al. ..... 220/360
7,384,129 B2 6/2008 Nagata et al. ..... 347/43
7,401,909 B2 7/2008 Inoue et al. ..... 347/86
7,407,274 B2 8/2008 Inoue et al. ..... 347/86
7,407,275 B2 8/2008 Inoue et al. ..... 347/86
7,552,837 B2 6/2009 Nanjo et al. ..... 220/360
7,686,442 B2 3/2010 Katsumura ..... 347/92
7,775,646 B2 8/2010 Yamaguchi ..... 347/86
7,914,137 B2 3/2011 Inoue et al. ..... 347/86
8,002,396 B2 8/2011 Yamada ..... 347/86
8,047,641 B2 11/2011 Nanjo et al. ..... 347/86
8,197,043 B2 6/2012 Watanabe et al. ..... 347/85
8,205,974 B2 6/2012 Ogura et al. ..... 347/86
8,425,022 B2 4/2013 Inoue et al. ..... 347/86
8,678,567 B2 3/2014 Shimizu et al. ..... 347/85
8,678,572 B2 3/2014 Kawate ..... 347/86
8,733,916 B2 5/2014 Kinoshita ..... 347/92
8,770,730 B2 7/2014 Nanjo et al. ..... 347/86
8,770,731 B2 7/2014 Miyashita et al. ..... 347/86
8,960,869 B2 2/2015 Takada et al. ..... 347/86
9,016,842 B2 4/2015 Miyashita et al. ..... 347/86
9,033,479 B2 5/2015 Kawate ..... 347/86
9,079,413 B2 7/2015 Kudo et al. ..... B41J 2/17556
9,102,162 B2 8/2015 Watanabe et al. ... B41J 2/16532
9,109,132 B2 8/2015 Nakano et al. ..... C08K 5/3415
9,144,985 B2 9/2015 Koike et al. ..... B41J 2/175
9,289,999 B2 3/2016 Koike et al. ..... B41J 2/17513
9,375,938 B2 6/2016 Kondo et al. ..... B41J 2/1752
9,381,748 B2 7/2016 Kimura et al. ..... B41J 2/175
9,409,407 B2 8/2016 Kudo et al. ..... B41J 29/02
9,567,473 B2 2/2017 Nakano et al. ..... C09D 11/322
9,605,172 B2 3/2017 Aoki et al. ..... C09D 11/324
9,815,295 B2 11/2017 Kudo et al. ..... B41J 2/19
9,878,551 B2 1/2018 Shimizu et al. ..... B41J 2/17523
2001/0017642 A1 8/2001 Shigemura ..... 347/85
2002/0122103 A1 9/2002 Yamamoto et al. .... B01F 23/00
2002/0140789 A1 10/2002 Tajima et al. ..... 347/87
2005/0068386 A1 3/2005 Hatasa et al. ..... B41J 2/175
2005/0099473 A1 5/2005 Katayama ..... 347/86
2006/0028514 A1 2/2006 Balducci et al. ..... 347/84
2006/0082626 A1 4/2006 Oikawa et al. ..... 347/86
2007/0236549 A1 10/2007 Yamada ..... 347/87
2008/0198207 A1 8/2008 Katada ..... 347/85
2012/0038719 A1 2/2012 Shimizu et al. ..... 347/86
2012/0125481 A1 5/2012 Matsumoto et al. ..... B65B 3/04
2012/0188315 A1 7/2012 Kawate ..... 347/87
2013/0169720 A1 7/2013 Nakamura et al. ..... B41J 2/175
2013/0187995 A1 7/2013 Kobashi et al. ..... B41J 2/17556
2013/0235133 A1 9/2013 Watanabe et al. ..... 347/92
2014/0043408 A1* 2/2014 Kudo ..... B41J 2/175 347/86
2014/0125743 A1 5/2014 Aruga ..... 347/86
2014/0160210 A1 6/2014 Kawate ..... 347/86
2014/0253645 A1 9/2014 Tsukahara et al. ..... B41J 2/175
2015/0049144 A1 2/2015 Aoki et al. ..... 347/85
2015/0049146 A1 2/2015 Nakano et al. ..... 347/86
2015/0049147 A1 2/2015 Nakano et al. ..... 347/87
2015/0109378 A1 4/2015 Koike et al. ..... 347/85
2015/0109379 A1 4/2015 Koike et al. ..... 347/85
2015/0306882 A1 10/2015 Kudo et al. ..... 347/87
2015/0352853 A1* 12/2015 Kudo ..... B41J 29/02 347/86
2015/0367648 A1 12/2015 Kimura et al. ..... 347/86
2016/0200113 A1 7/2016 Nanjo et al. ..... 347/86
2016/0200114 A1 7/2016 Nanjo et al. ..... 347/86
2017/0120608 A1 5/2017 Takaoka et al. ..... B41J 2/17506
2017/0120609 A1 5/2017 Kimura et al. ..... B41J 2/17509
2017/0120612 A1 5/2017 Fukuchi et al. ..... B41J 2/17553
2017/0120613 A1 5/2017 Ikebe et al. ..... B41J 2/17553

FOREIGN PATENT DOCUMENTS

CN 101049763 10/2007
CN 104085197 10/2014
CN 104553338 4/2015
EP 0773109 5/1997
JP H08-90785 4/1996
JP H09-323430 12/1997
JP 2007-144643 6/2007

(56) References Cited

FOREIGN PATENT DOCUMENTS

| | | | |
|---|---|---|---|
| JP | 2010-208151 | | 9/2010 |
| JP | 2012-051308 | | 3/2012 |
| JP | 2012-061624 | | 3/2012 |
| JP | 2012-196777 | | 10/2012 |
| JP | 2013-067111 | | 4/2013 |
| JP | 2013-146977 | | 8/2013 |
| JP | 2013-151100 | | 8/2013 |
| JP | 2013-151101 | | 8/2013 |
| JP | 2013-184424 | | 9/2013 |
| JP | 2014-054823 | | 3/2014 |
| JP | 2014-054826 | | 3/2014 |
| JP | 2014-079932 | | 5/2014 |
| JP | 2014-156125 | | 8/2014 |
| JP | 2014-177033 | | 9/2014 |
| JP | 2014-195908 | | 10/2014 |
| JP | 2015-044379 | | 3/2015 |
| JP | 2015-061749 | | 4/2015 |
| JP | 2015-147423 | | 8/2015 |
| JP | 2015-178281 | | 10/2015 |
| JP | 2015-091670 | | 5/2016 |
| JP | 2017-013242 | | 1/2017 |
| JP | 2017-077652 | | 4/2017 |
| KR | 10-1999-0014249 | | 2/1999 |
| KR | 2002-0066202 | | 8/2002 |
| KR | 2005-0031385 | | 4/2005 |
| KR | 10-0517102 | B | 9/2005 |
| KR | 10-2012-0041254 | | 4/2012 |
| KR | 10-1484827 | B1 | 1/2015 |
| KR | 10-1509359 | B1 | 4/2015 |
| KR | 2015-0121227 | | 10/2015 |
| KR | 10-2016-0044584 | | 4/2016 |
| WO | 2013/085023 | | 6/2013 |
| WO | 2014/112344 | | 7/2014 |
| WO | 2015/059926 | | 4/2015 |

OTHER PUBLICATIONS

Office Action dated Apr. 7, 2020 in counterpart Chinese Application No. 201910293315.2, together with English translation thereof.
Office Action dated dated May 26, 2020 in counterpart Japanese Application No. 2020-027079, together with English translation thereof.
Office Action dated dated Aug. 11, 2020 in counterpart Japanese Application No. 2020-027079, together with English translation thereof.
Office Action dated Sep. 17, 2020 in counterpart Korean Application No. 10-2019-0143148, together with English Translation thereof.
Office Action dated Jan. 29, 2021 in counterpart Korean Application No. 10-2019-0143148, together with English Translation thereof.
Office Action dated Apr. 28, 2021 in counterpart Chinese Application No. 201910293315.2, together with English translation thereof.
Office Action dated Jun. 29, 2021 in counterpart Japanese Application No. 2020-027079, together with English translation thereof.
Office Action dated Jun. 16, 2021 in counterpart Korean Application No. 10-2021-0040151, together with English translation thereof.
Office Action dated Oct. 19, 2021 in counterpart Japanese Application No. 2020-187818, together with English translation thereof.
Office Action dated Mar. 8, 2022 in counterpart Japanese Application No. 2020-187818, together with English translation thereof.
Office Action dated Oct. 18, 2022 in counterpart Japanese Application No. 2021-140216, together with English translation thereof.
Notice of Allowance dated Sep. 5, 2023 in counterpart Korean Application No. 10-2023-0009516, together with English translation thereof.
Office Action dated Jul. 12, 2022 in counterpart Japanese Application No. 2021-140216, together with English translation thereof.
Chinese Office Action dated Aug. 24, 2018 issued in counterpart Chinese Application No. 201601963802.1 (with whole English Translation).
Office Action dated Sep. 11, 2018 in counterpart Japan Application No. 2015-214358, together with English translation thereof.

* cited by examiner

PRINTING APPARATUS AND LIQUID STORAGE MEMBER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[This application is a division of application Ser. No. 15/296,876 filed Oct. 18, 2016, currently pending; and claims priority under 35 U.S.C. § 119 to Japan Application 2015-214358 filed in Japan on Oct. 30, 2015; and the contents of all of which are incorporated herein by reference as if set forth in full.]

*Notice: More than one reissue application has been filed for the reissue of U.S. Pat. No. 10,118,396. The reissue application numbers are application Ser. No. 16/728,460 filed Dec. 27, 2019, this application Ser. No. 17/750,772 filed May 23, 2022, and application Ser. No. 18/806,622 filed Aug. 15, 2024.*

*This application is for reissue of U.S. Pat. No. 10,118,396 issued Nov. 6, 2018. This application is also a continuation reissue of U.S. patent application Ser. No. 16/728,460 filed Dec. 27, 2019, issued Dec. 20, 2022 as Re. 49,336, which itself is a reissue of U.S. Pat. No. 10,118,396, which was filed as U.S. patent application Ser. No. 15/643,225 on Jul. 6, 2017, and which is a division of U.S. patent application Ser. No. 15/296,876 filed Oct. 18, 2016, now issued as U.S. Pat. No. 9,738,081 on Aug. 22, 2017; and claims priority under 35 U.S.C. .§ 119 to Japan Application No. 2015-214358 filed in Japan on Oct. 30, 2015; and the contents of all of which are incorporated herein by reference as if set forth in full.*

BACKGROUND OF THE INVENTION

Field of the Invention

The present invention relates to a printing apparatus that performs a printing operation by ejecting ink onto a printing medium and a liquid storage member used in a printing apparatus.

Description of the Related Art

For a conventional ink jet printing apparatus, there is a configuration including a head that ejects ink, an ink tank that stores ink, and an ink flow path that connects the head and the ink tank (Japanese Patent Laid-Open No. 2010-208151). The ink tank has a buffer tank communicating with the atmosphere and is designed so that air flows into the ink tank from the buffer tank in the case where ink is consumed in the head.

In the ink jet printing apparatus described in Japanese Patent Laid-Open No. 2010-208151, the opening of a communication flow path through which the ink tank and the buffer tank communicate within the buffer than is arranged under an ejection port surface of the head so as to prevent ink from leaking out of the head. Due to the configuration such as this, the interior of the head is maintained in the negative pressure state by a hydraulic head difference.

SUMMARY OF THE INVENTION

In the field of the ink jet printing apparatus, there exists an ink jet printing apparatus including an injection port through which ink can be injected into an ink tank from the top of the ink tank. In the ink jet printing apparatus such as this, it is difficult to maintain the negative pressure state within the head by making use of the hydraulic head difference as in Japanese Patent Laid-Open No. 2010-208151.

That is, in the configuration of the ink jet printing apparatus described in Japanese Patent Laid-Open No. 2010-208151, the injection port is provided on the top of the ink tank and in the case where the injection port opens, the ink tank is caused to communicate with the atmosphere via the injection port. In this case, there is a possibility that the ink within the ink tank leaks out to the outside through the buffer tank and the atmosphere communication port of the buffer tank.

An object of the present invention is to provide a printing apparatus or a liquid storage member that suppresses ink from leaking out to the outside at the time of ink injection in a configuration in which an injection port is provided to an ink tank. The printing apparatus of the present invention includes a print head that performs a printing operation by ejecting a liquid, a liquid storage container in which a liquid storage chamber that stores the liquid to be supplied to the print head, an atmosphere communication chamber that communicates with the atmosphere, and a communication flow path that causes the liquid storage chamber and the atmosphere communication chamber to communicate are formed integrally, and a liquid injection portion provided on the liquid storage container and configured to be injected the liquid into the liquid storage chamber from the outside, and the liquid storage container can take a first posture in which the atmosphere communication chamber is located under the liquid storage chamber in the direction of gravity and a second posture in which the atmosphere communication chamber and the liquid storage chamber are located side by side in the horizontal direction, and in the case where the posture of the liquid storage container is the second posture, the liquid injection portion and the communication flow path are located on the upper side of the liquid storage container.

Further features of the present invention will become apparent from the following description of exemplary embodiments (with reference to the attached drawings).

DESCRIPTION OF THE EMBODIMENTS

First Embodiment

Hereinafter, embodiments of the present invention are explained in detail with reference to the attached drawings. Explanation is given by attaching the same symbols to the same configurations through each drawing. In the present embodiment, as a printing apparatus, a serial-type ink jet printing apparatus 11 (hereinafter, described as a "printing apparatus") is explained as an example.

Figure 1:
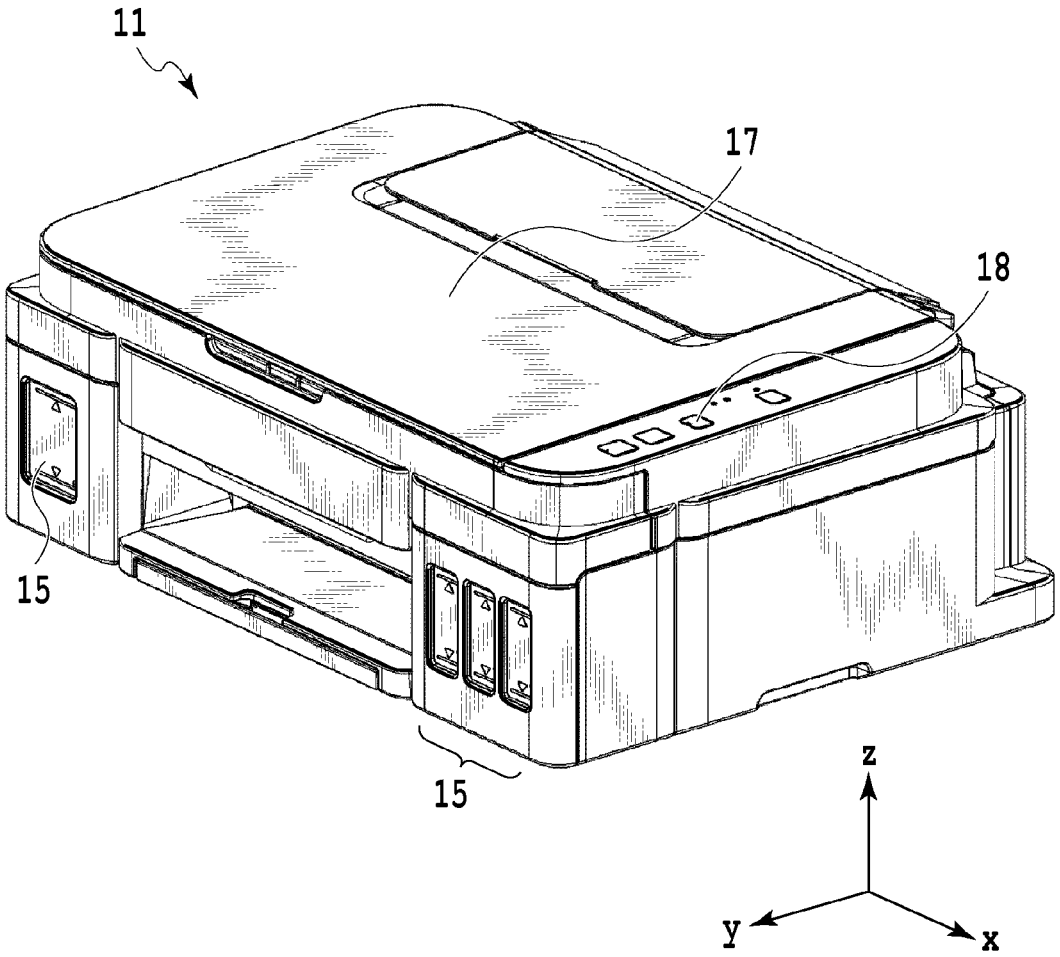
FIG. 1 an external perspective view of a printing apparatus in an embodiment.

FIG. 1 is an external perspective view showing an outline of the printing apparatus 11 in the present embodiment. As shown in FIG. 1, the printing apparatus 11 of the present embodiment includes a casing, a printing unit (not shown) configured to perform a printing operation mainly on a printing medium (not shown), and an ink tank 15 that stores ink in the printing unit. In the present embodiment, the ink tank 15 is arranged on the front surface of the casing of the printing apparatus 11. On the top of the casing, a scanner unit 17, an operation input unit 18 capable of receiving an input of instructions or the like by a user, etc., are arranged. For explanation, the coordinate axes are set so that the main scanning direction of the printing apparatus 11 is the X axis, the sub scanning direction is the Y axis, and the direction perpendicular to the X axis and the Y axis is the Z axis. Through each drawing, each of the directions of the X, Y, and Z axes indicates the same direction.

Figure 2:
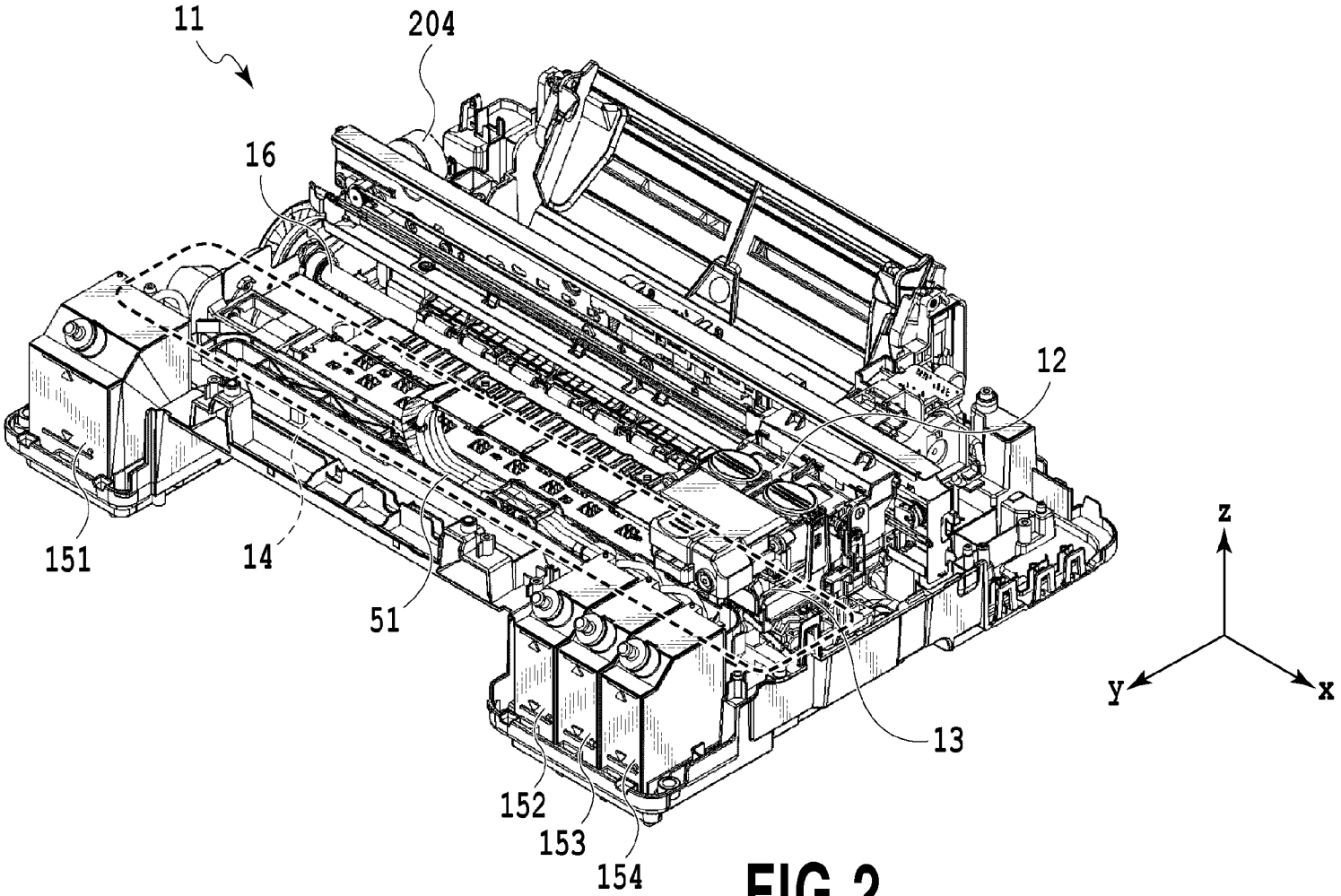
FIG. 2 is a perspective view showing an internal configuration of the printing apparatus in the embodiment.

FIG. 2 is a perspective view showing an internal configuration of the printing apparatus 11 in the present embodiment. As shown in FIG. 2, the printing apparatus 11 includes a paper feed roller (not shown), a conveyance roller 16, and a paper discharge roller (not shown) as a configuration for conveying a printing medium in the form of a sheet. Further, the printing apparatus 11 includes a maintenance unit (not shown) of a print head 13, a main chassis, a timing belt, and a carriage motor 204.

A carriage 12 receives a drive from the carriage motor 204 via the timing belt while being supported by the main chassis and moves along the main scanning direction perpendicular to the conveyance direction of a printing medium. Due to the configuration such as this, it is possible for the print head 13 to reciprocate along the main scanning direction together with a carriage 12. In the vicinity of the carriage 12, a code strip for detecting the position of the carriage 12 is installed in a stretched state in parallel to the timing belt. In the code strip, for example, markings are formed at a pitch of 150 to 300 per inch. On the other hand, on the carriage 12, an encode sensor for reading the code strip is mounted.

In the present embodiment, it is possible for the print head 13 to eject inks of four colors (cyan, magenta, yellow, black) and ejection units 131 each ejecting each of the inks of four colors are arranged in parallel to one another in the main scanning direction. The ejection unit 131 is formed by, for example, an ejection port (nozzle) corresponding to each of the inks of four colors and an ejection port formation surface, to be described later, refers to a surface on which the ejection port in the print head 13 is formed. The print head 13 prints an image by ejecting each ink to a printing medium based on image data input to the printing apparatus 11. The printing medium may be any medium on which an image can be formed by landing ink droplets. For example, it is possible to use those of various materials and in various forms, such as paper, cloth, an optical disk label surface, a plastic sheet, an OHP sheet, and an envelope. Further, the printing apparatus 11 includes an ink flow path 14 of each ink corresponding to the ink of each color of the print head 13 and can supply the ink of each color to the print head from the ink tank 15. The printing apparatus 11 of the present embodiment includes four kinds of ink tank: a tank for black 151, a tank for cyan 152, a tank for magenta 153, and a tank for yellow 154.

Further, the printing apparatus 11 includes a maintenance unit within a movement range in the scanning direction of the carriage 12. The maintenance unit includes a recovery unit configured to perform recovery processing of the print head 13 and is arranged so as to face the ejection unit 131, to be described later. The recovery unit includes a cap unit configured to cap the ejection unit 131 and a suction mechanism configured to forcibly suck in ink in the capped state to remove the residual bubbles and the ink of which the viscosity has been increased within the ejection unit 131. By the recovery processing of the recovery unit, the function of the print head 13 is recovered and at the same time, the ejection characteristics of the print head are maintained.

Figure 3:
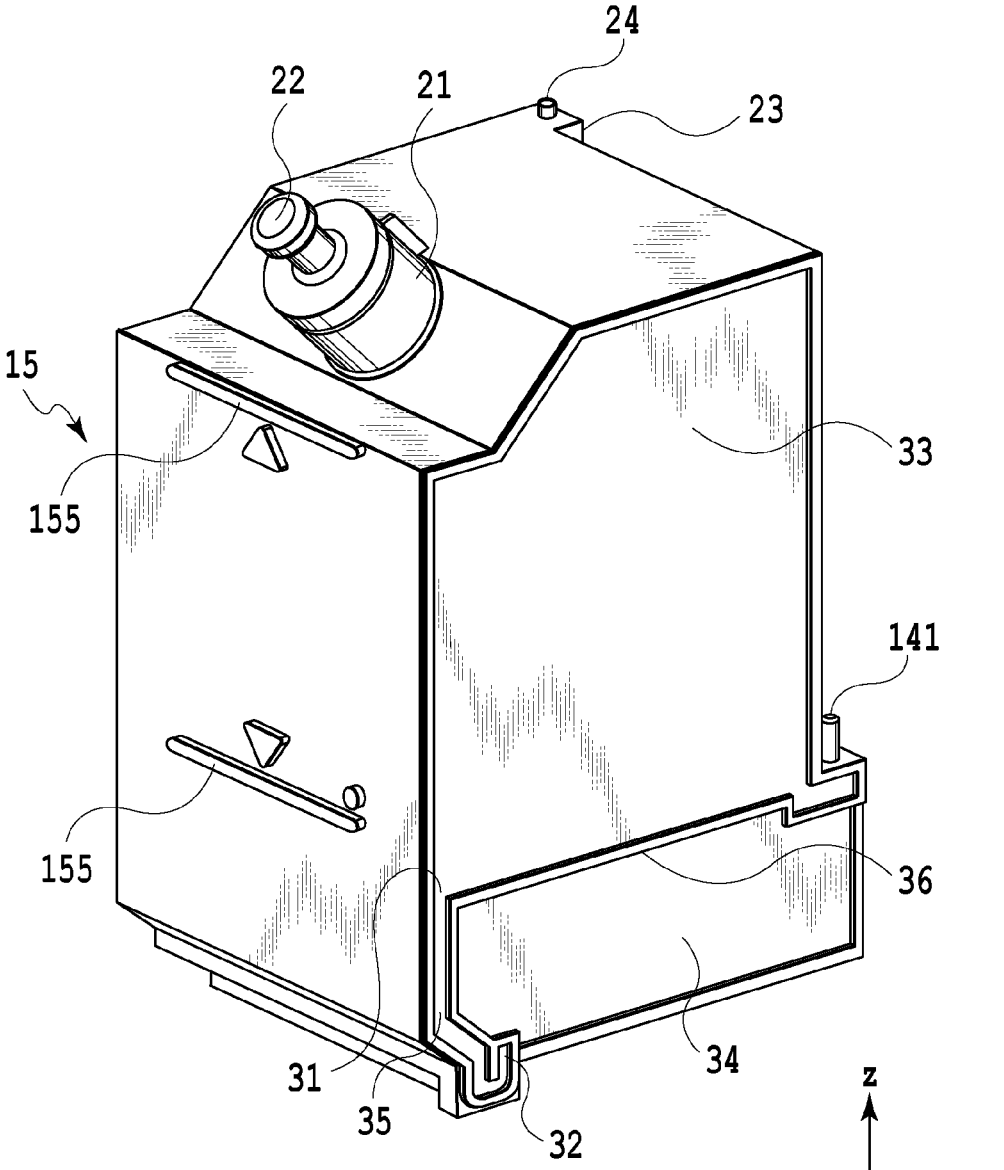
FIG. 3 is an external perspective view of an ink tank in the embodiment.

FIG. 3 is an external perspective view of the ink tank 15 in the present embodiment. As in FIG. 1, the Y-axis direction indicates the longitudinal direction (hereinafter, sometimes described as "the front side and the rear side") of the printing apparatus 11 and the Z-axis direction indicates the height direction (hereinafter, sometimes described as "the top side and the bottom side"). The ink tank 15 in FIG. 3 is the ink tank 15 in the "first posture state", to be described later in FIG. 4B.

As shown in FIG. 3, on the front side in the longitudinal direction of the ink tank 15, an index 155 indicating the amount of ink in an ink storage chamber 33 is formed. On an inclined surface on the top-front side of the ink tank 15, an ink injection port 21 through which ink is injected into the ink storage chamber (into the liquid storage chamber) is arranged. To the ink injection port 21, a tank cap 22 is attached in an attachable/detachable manner. In the present embodiment, in the direction of gravity, on the top of the ink tank 15, the ink storage chamber 33 that stores ink is arranged and at the bottom of the ink tank, a buffer space 34 capable of temporarily storing ink is arranged. The ink injection port 21 communicates with the ink storage chamber 33 and receives injection of ink from the outside of the ink tank 15. The ink tank 15 and the ink injection port 21 configure the liquid storage container (liquid storage member) and the liquid injection portion, respectively, in the present invention. The ink storage chamber 33 and the buffer space 34 configure the liquid storage chamber and the atmosphere communication chamber, respectively, in the present invention.

The ink storage chamber 33 and the buffer space 34 communicate via a communication flow path 35. In the present embodiment, the ink storage chamber 33 and the buffer space 34 share part of the bottom surface of the ink storage chamber 33 so that the bottom surface serves as the ceiling surface of the buffer space 34. It can be said that the bottom surface of the ink storage chamber 33 and the ceiling surface of the buffer space 34 are partition walls 36 that define the ink storage chamber 33 and the buffer space 34.

As shown in FIG. 3, the communication flow path 35 is arranged on the bottom-front side of the ink tank 15. In the first posture of the ink tank 15, one end of the communication flow path 35 is connected to the bottom surface side of the ink storage chamber 33 and the other end of the communication flow path 35 is connected to the bottom surface side of the buffer space 34. Further, in the ink tank 15 of the present embodiment, the ink storage chamber 33, the buffer space 34, and the communication flow path 35 are formed integrally.

An ink outflow unit 141 communicates with the ink storage chamber 33 and supplies ink to the print head 13 by causing the ink to flow out. The ink outflow unit 141 is formed in the vicinity of the bottom surface of the ink storage chamber 33. The ink outflow unit 141 configures the liquid outflow unit in the present invention.

The buffer space 34 and the outside of the ink tank 15 communicate via an atmosphere communication flow path 23 including an atmosphere opening 24 that opens into the atmosphere. In the present embodiment, the atmosphere communication flow path 23 is arranged on the rear side of the ink tank 15 and the atmosphere opening 24 is arranged in the vicinity of the top of the ink tank 15. Due to the configuration such as this, in the case where the ink in the ink storage chamber 33 is consumed in the state of being hermetically closed by the tank cap 22, it is possible to take in the outside air via the atmosphere communication flow path 23 and the atmosphere opening 24. It is possible for the ink tank 15 of the present embodiment to store the ink in the buffer space 34, which is pushed out by the expanded air, in the case where the air within the ink storage chamber 33 expands due to the fluctuations in pressure or the change in temperature as in the case of the ink tank described in Japanese Patent Laid-Open No. 2010-208151. Due to the configuration such as this, it is possible to prevent the ink that is pushed out by the expanded air and which flows backward through the atmosphere communication flow path 23 from leaking out through the atmosphere opening 24.

Figures 4A, 4B, 4C:
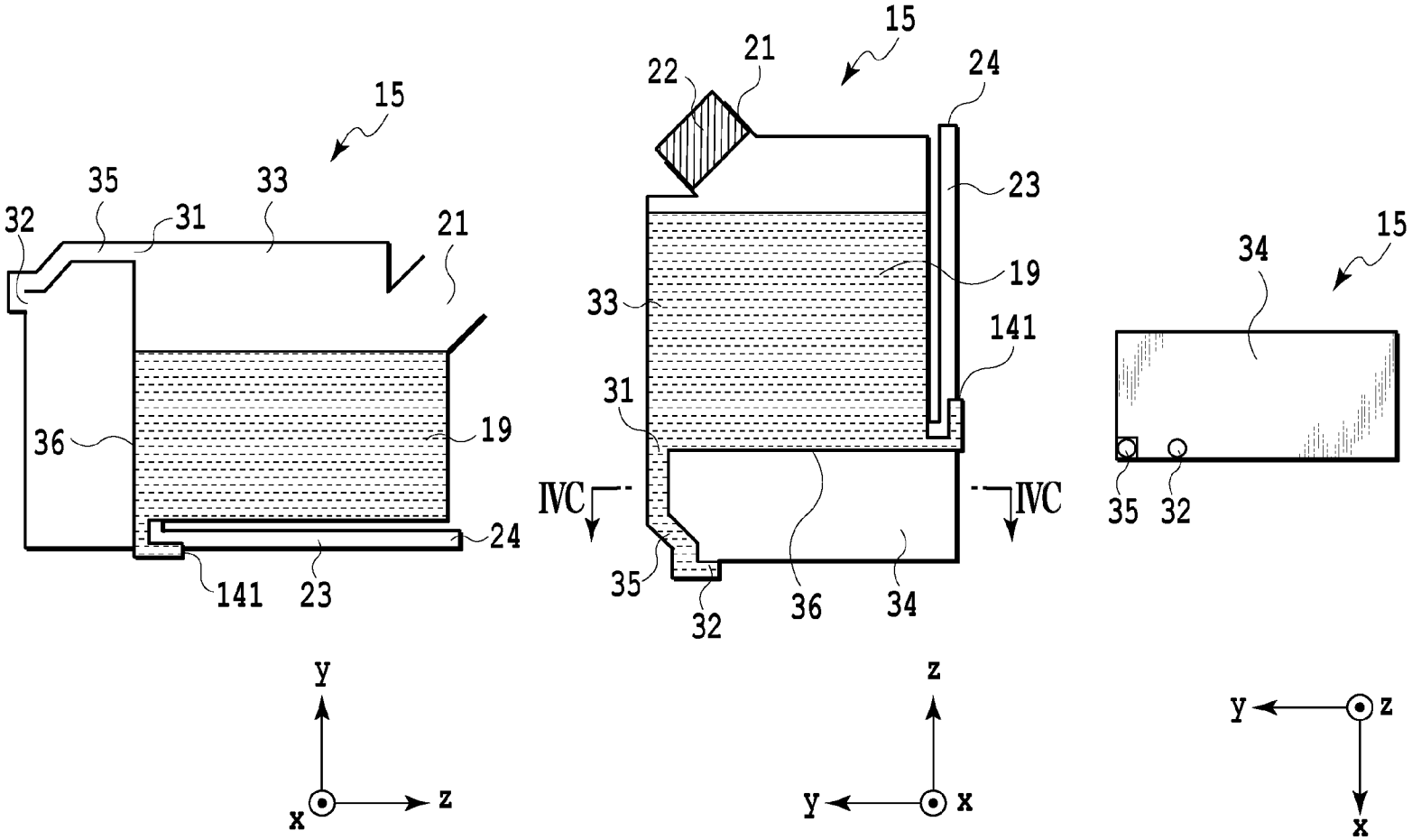
FIG. 4A is a schematic diagram showing a section (second posture state) of the ink tank in the embodiment.
FIG. 4B is a schematic diagram showing a section (first posture state) of the ink tank in the embodiment.
FIG. 4C is a section view along IVC-IVC line of the ink tank in the embodiment.

FIG. 4A to FIG. 4C are each a schematic diagram showing a section of the ink tank 15 in the present embodiment. FIG. 4A is a schematic diagram showing the ink tank 15 in the second posture state and FIG. 4B is a schematic diagram showing the ink tank 15 in the first posture state. FIG. 4C is a section view along IVC-IVC line in FIG. 4B. In the present embodiment, the ink tank 15 is configured so as to be capable of being removable from the printing apparatus 11 and is formed so as to be capable of changing into the first posture state and the second posture state before and after attachment/detachment. In the present embodiment, the ink outflow unit 141 is connected to the ink flow path 14 also after attachment/detachment.

FIG. 4A shows the second posture state, which is the posture of the ink tank 15 in the case where ink is injected. The second posture refers to the posture in which the ink tank 15 is arranged so that the buffer space 34 and the ink storage chamber 33 are put side by side in the horizontal direction. Further, in the case where the posture of the ink tank 15 is the second posture, the ink injection port 21 and the communication flow path 35 are located on the upper side of the ink tank 15 and the ink outflow unit 141 is located on the lower side of the ink tank 15. After being detached from the printing apparatus 11, the ink tank 15 is tilted so that the communication flow path 35 and the ink injection port 21 are located on the top side (the top side is in the positive Y-axis direction). Next, after the tank cap 22 is detached, it is made possible to inject ink into the ink tank 15. Even in the case where ink is injected through the ink injection port 21 in the second posture state, the communication flow path 35 is always located above the liquid surface of an ink 19 in the ink storage chamber 33, and therefore, the ink 19 does not flow into the buffer space 34 via the communication flow path 35. After the ink is injected, the ink injection port 21 of the ink tank 15 is closed by the tank cap 22.

In the present embodiment, at the time of ink injection, in the case where the liquid surface within the ink tank 15 is at a height position that does not exceed a height position (Zh) of the ejection port formation surface of the head in the second posture (see FIG. 4A), it is made possible to inject ink into the ink tank 15 without the need to provide an open/close valve in the ink flow path 14. That is, in the second posture, even in the state where the ink injection port 21 is open, there exists a hydraulic head difference necessary to maintain the negative pressure within the head, and therefore, it becomes more unlikely that the ink leaks out of the head.

Further, in the case where an open/close valve is provided in the ink flow path 14, it is no longer necessary to take into consideration the position (hydraulic head difference) of the ink tank at the time of ink injection, and it is also possible to more securely suppress the leakage of ink at the time of ink injection.

FIG. 4B shows the first posture state, which is the posture of the ink tank 15 in the case of being attached to the printing apparatus 11 after ink injection. The first posture refers to the posture in which the buffer space 34 is located under the ink storage chamber 33 in the direction of gravity. The ink tank 15 of the present embodiment is attached to the printing apparatus 11 in the above-described first posture state. At this time, in the ink tank 15, the ink injection port 21 is hermetically closed by the tank cap 22, and therefore, air does not enter the ink tank 15 through the ink injection port 21. In the first posture, one end of the communication flow path 35 is connected to the bottom surface side of the ink storage chamber 33 and the other end is connected to the bottom surface side of the buffer space 34. Further, the communication flow path 35 and the opening 32 are arranged on the bottom-front side (the front side is in the positive Y-axis direction) of the ink tank 15 and the atmosphere opening 24 is arranged on the top-rear side (the top side is in the positive Z-axis direction) of the ink tank 15.

As shown in FIG. 4C, in the first posture state, the opening 32 of the communication flow path 35 in the buffer space 34 is formed on the bottom surface of the buffer space 34 facing the upper side in the direction of gravity. Due to the configuration such as this, a meniscus is formed in the opening 32 of the communication flow path 35, and therefore, the ink in the ink storage chamber 33 does not flow out into the buffer space 34 located ahead of the opening 32.

Figure 5A:
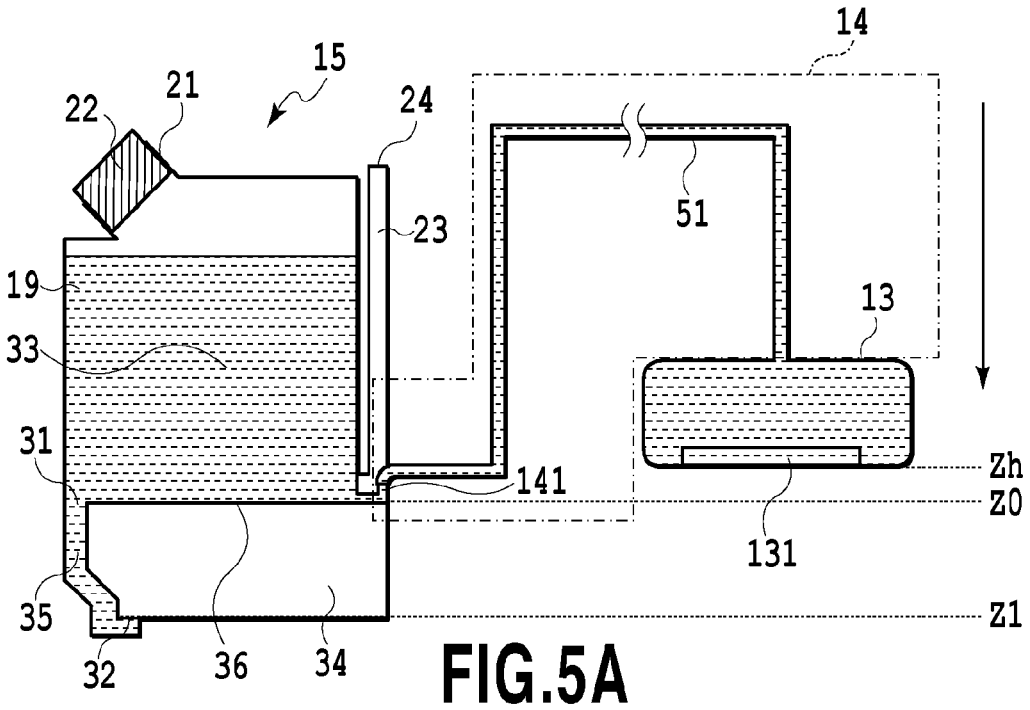
FIG. 5A is a section view showing an ink-filled state in the printing apparatus of the embodiment.
Figure 5B:
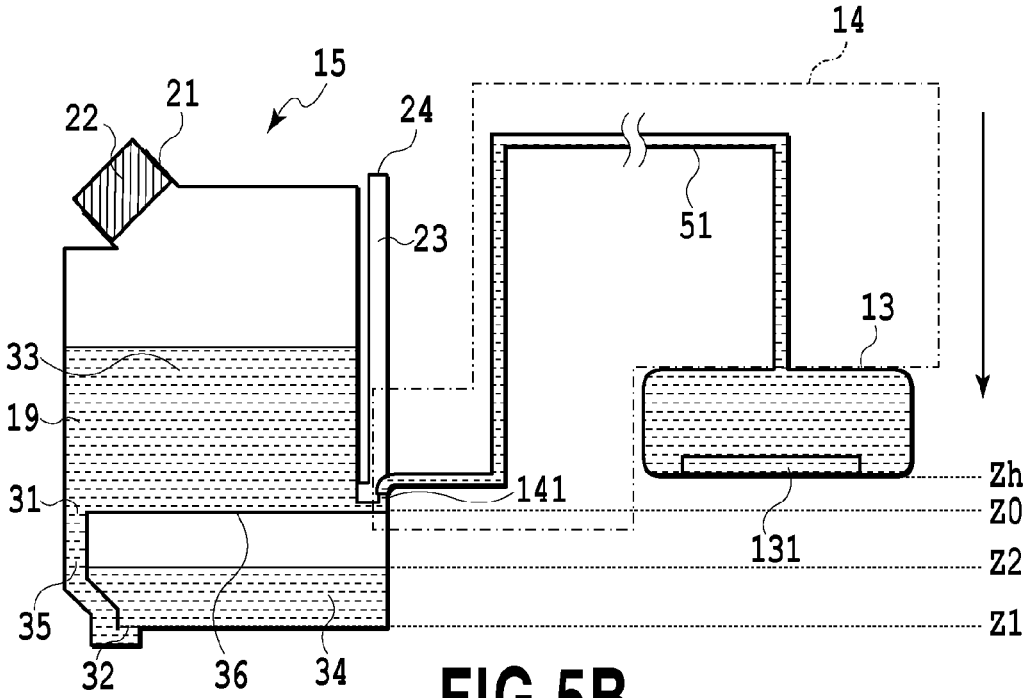
FIG. 5B is a section view showing the ink-filled state in the printing apparatus of the embodiment.

FIG. 5A and FIG. 5B are each a schematic section view showing an ink-filled state of the ink tank 15 and the print head 13 in the printing apparatus 11 of the present embodiment. A tube 51 extends from the ink outflow unit 141 of the ink tank 15 and communicates with the print head 13 and is used to cause the ink 19 in the ink storage chamber 33 to flow out to be supplied to the print head 13. In the present embodiment, the ink outflow unit 141 and the tube 51 configure the ink flow path 14. Further, the tube 51 configures the second communication flow path of the present invention.

FIG. 5A shows a state where up to the inside of the print head 13 is filled with the ink within the ink storage chamber 33 via the ink flow path 14. In the state where the print head 13 is filled with ink in FIG. 5A, in the case where the ink in the print head 13 is ejected through the ink ejection unit 131, it is possible for the print head 13 to receive supply of ink corresponding to the amount of consumed ink from the ink storage chamber 33.

In FIG. 5A, the arrow indicates the direction of gravity and the "height" in the following explanation of FIGS. 5A and 5B and FIGS. 8A and 8B means the height in the direction of gravity.

The height of the ejection port formation surface, which is the arrangement surface on which the ejection units 131 are arranged side by side, is taken to be Zh and the lowest position in the ink flow path 14, which is the flow path connecting the ink outflow unit 141 and the print head 13, is taken to be Z0. In the present embodiment, the ink outflow unit 141 is provided at the position the height of which is the same as that of the bottom surface (partition wall surface of the partition wall 36) of the ink storage chamber 33.

Further, the height of the position of the opening 32 in the communication flow path 35 is taken to be Z1. At this time, the height Z1 corresponds to the liquid surface height of ink at which the gas-liquid exchange between the ink and the atmosphere is performed as the ink is consumed by the print head 13.

As described previously, the buffer space 34 is located under the ink storage chamber 33 in the direction of gravity, and therefore, the position (Z1) of the opening 32 is arranged on the lower side of the height (Zh) of the ejection port formation surface of the print head 13. Due to the configuration such as this, it is possible for the printing apparatus 11 of the present embodiment to cause a hydraulic head difference to occur between Zh and Z1 and to favorably keep the negative pressure within the print head 13. Further, in the printing apparatus 11 of the present embodiment, a meniscus is formed also in the ejection port (ejection unit 131), and therefore, the backflow of ink into the ink storage chamber 33 is prevented, which is caused by air being mixed through the ejection port.

FIG. 5B shows a state where the air within the ink storage chamber 33 expands due to the fluctuations in the pressure and the change in temperature and the ink 19 in the ink storage chamber 33 is pushed out into the buffer space 34. A height Z2 of the ink liquid surface in the buffer space 34 corresponds to the height at which the gas-liquid exchange between the ink and the atmosphere is performed.

The height Z2 of the ink liquid surface is arranged under the height (Zh) of the ejection port formation surface of the print head 13. Because of this, even in the case where the ink 19 is pushed out into the buffer space 34, the negative pressure within the print head 13 does not change reversely to the positive pressure immediately, and therefore, it is unlikely that the ink leaks out of the print head 13.

Further, by limiting the height (Z2) of the ink liquid surface in the buffer space 34 to the position (Z0) of the partition wall surface or lower, which is the surface of the partition wall 36, the height (Z2) is always lower than the height of the ejection port formation surface of the print head 13, and therefore, it is possible to stably keep the negative pressure within the print head.

By limiting the height (Z2) of the ink liquid surface in the buffer space 34 to the position (Z0) of the partition wall surface or lower and further setting the lowest position in the ink flow path 14 to the position (Z0) of the partition wall surface or higher, the ink flow path 14 will always be located at the position higher than the height (Z2) of the ink liquid surface. Because of this, even in the case where air is mixed within the ink flow path 14, it is possible to favorably keep the negative pressure within the print head. Due to the configuration such as this, it is possible for the printing apparatus 11 of the present embodiment to favorably keep the negative pressure within the print head 13 even in the case where ink is stored in the buffer space 34.

As explained above, it is possible for the ink tank 15 of the present embodiment to take the first posture in which the buffer space 34 is located under the ink storage chamber 33 in the direction of gravity and the second posture in which the buffer space 34 and the ink storage chamber 33 are located side by side in the horizontal direction. Due to the configuration such as this, it is unlikely for the printing apparatus 11 of the present embodiment to cause the atmosphere to communicate through the ink injection port in the state where the negative pressure in the print head 13 is kept favorably. Because of this, even in the case of a configuration in which the ink injection port 21 is provided to the ink tank 15, it is possible to suppress ink from leaking out to the outside at the time of ink injection.

Second Embodiment

Figure 6A:
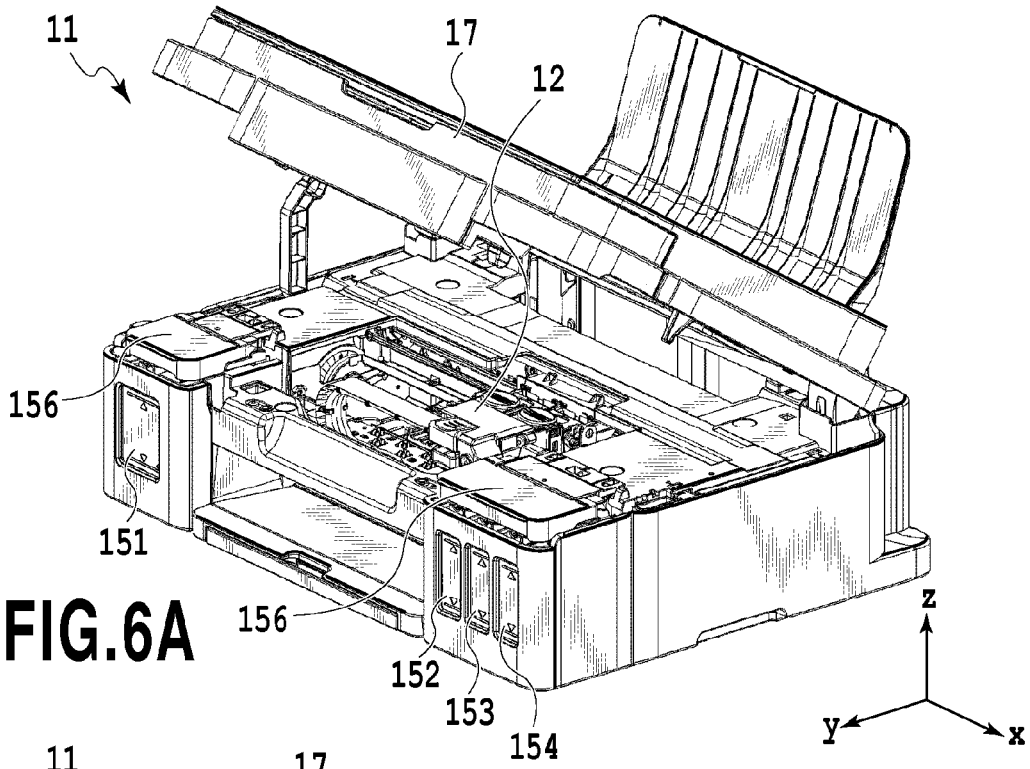
FIG. 6A is an external perspective view of a printing apparatus in a second embodiment.
Figure 6B:
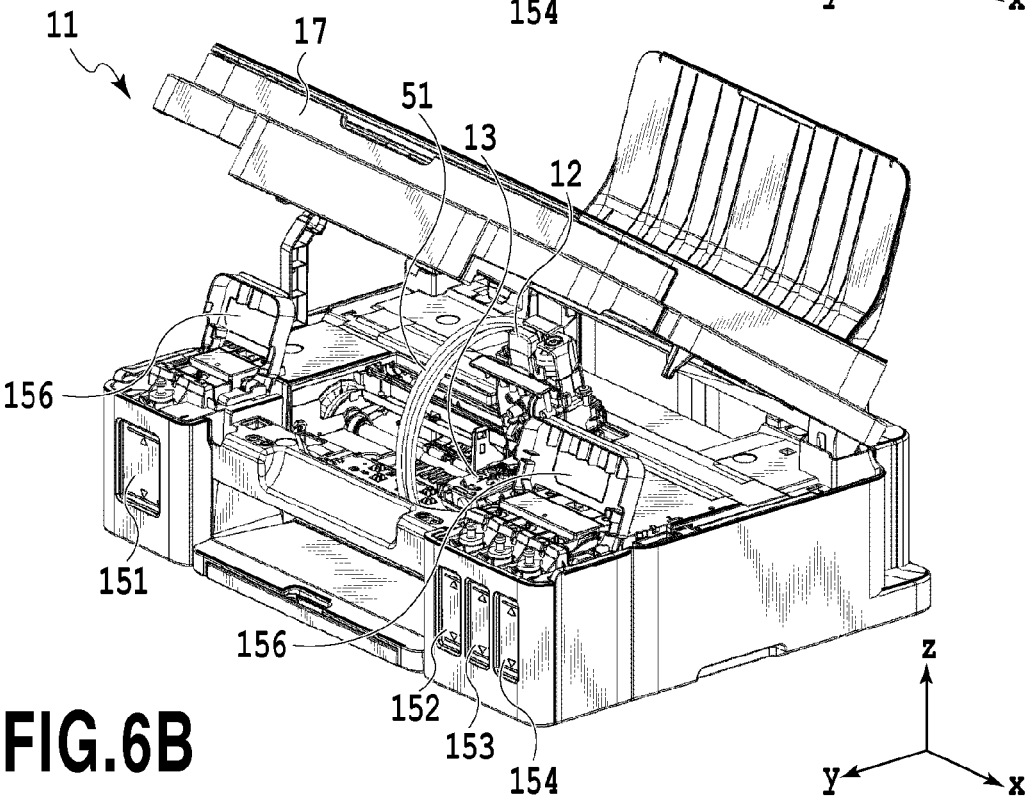
FIG. 6B is an external perspective view of the printing apparatus in the second embodiment.

FIG. 6A and FIG. 6B are each an external perspective view showing an outline of the printing apparatus 11 in the present embodiment. FIG. 6A is an external perspective view illustrating a state where the scanner unit 17 of the printing apparatus 11 of the present embodiment is open and FIG. 6B is an external perspective view showing a state where the carriage 12 and an ink tank cover 156 of the printing apparatus 11 are open. In explanation of the present embodiment, the same symbols are attached to the same configurations as those of the first embodiment and explanation of the duplicated contents is omitted.

As shown in FIG. 6A, the canner unit 17 is configured so as to be capable of being opened from and closed to the casing of the printing apparatus 11 and by lifting the canner unit 17, an open area is formed.

As shown in FIG. 6B, the carriage 12 and the ink tank cover 156 are configured so as to be capable of being opened/closed. It is made possible for a user to exchange the print head 13 with another by lifting the carriage 12 and to access the ink tank 15 by lifting the ink tank cover 156. Further, the tube 51 that communicates with each ink tank is connected and via the tube 51, each ink is supplied to the print head 13. As in the first embodiment, the ink outflow unit 141 and the tube 51 configure the ink flow path 14. In the present embodiment, a valve 26 is provided that connects the ink outflow unit 141 and the print head 13, opens/closes the tube 51 through which ink is supplied from the ink storage chamber 33 to the print head 13, and cuts out communication between ink and air.

Figure 7:
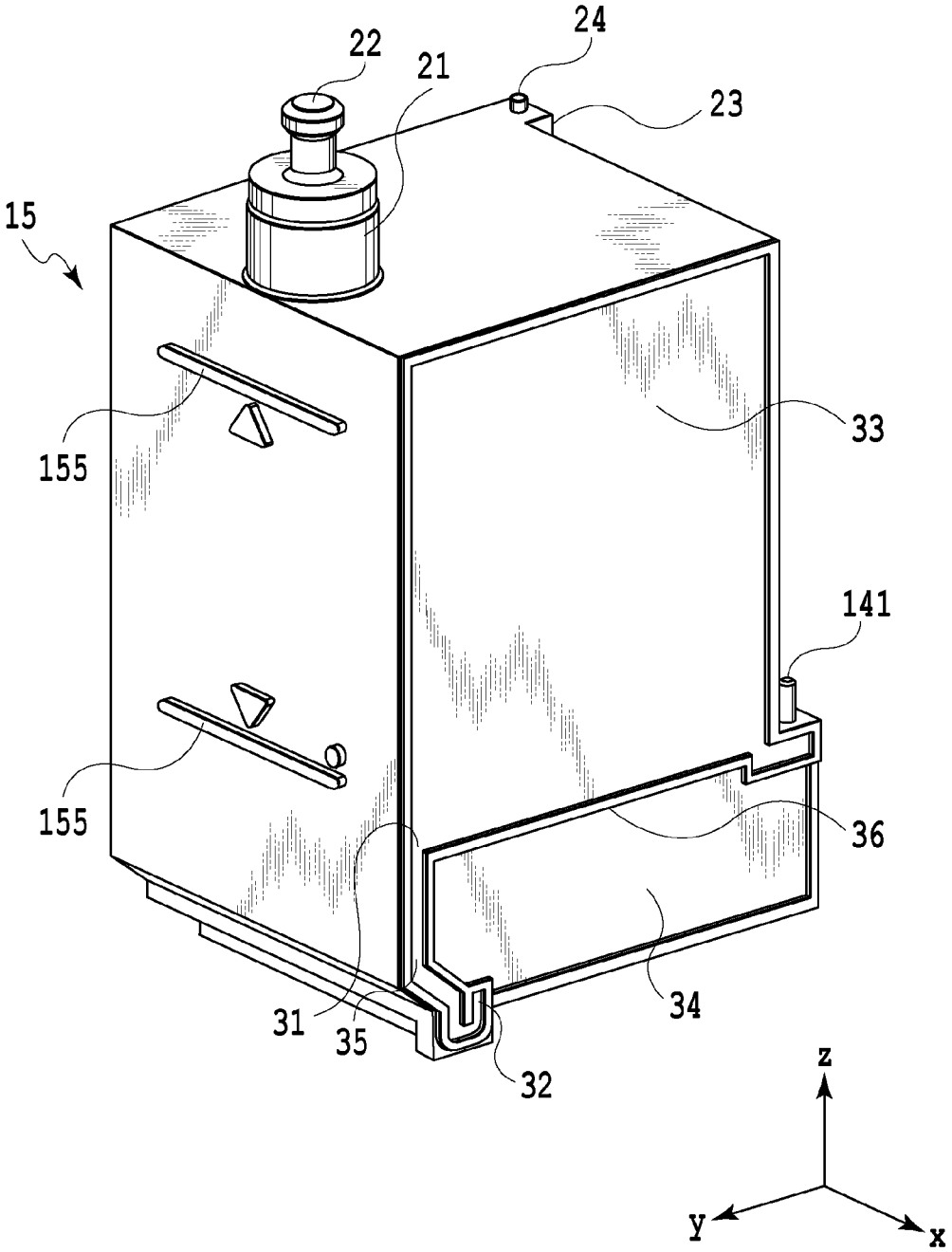
FIG. 7 is an external perspective view of an ink tank in the second embodiment.

FIG. 7 is an external perspective view showing the ink tank 15 in the present embodiment. The buffer space 34 and the outside of the ink tank 15 communicate with each other via the atmosphere communication flow path 23 and the atmosphere opening 24. The atmosphere communication flow path 23 is arranged on the rear side of the ink tank 15 and the atmosphere opening 24 is arranged in the vicinity of the top of the ink tank 15. In the present embodiment, a valve 25 is provided that opens/closes the atmosphere communication flow path 23 that causes the buffer space 34 and the atmosphere opening 24 to communicate and cuts off the communication of air.

Figure 8A:
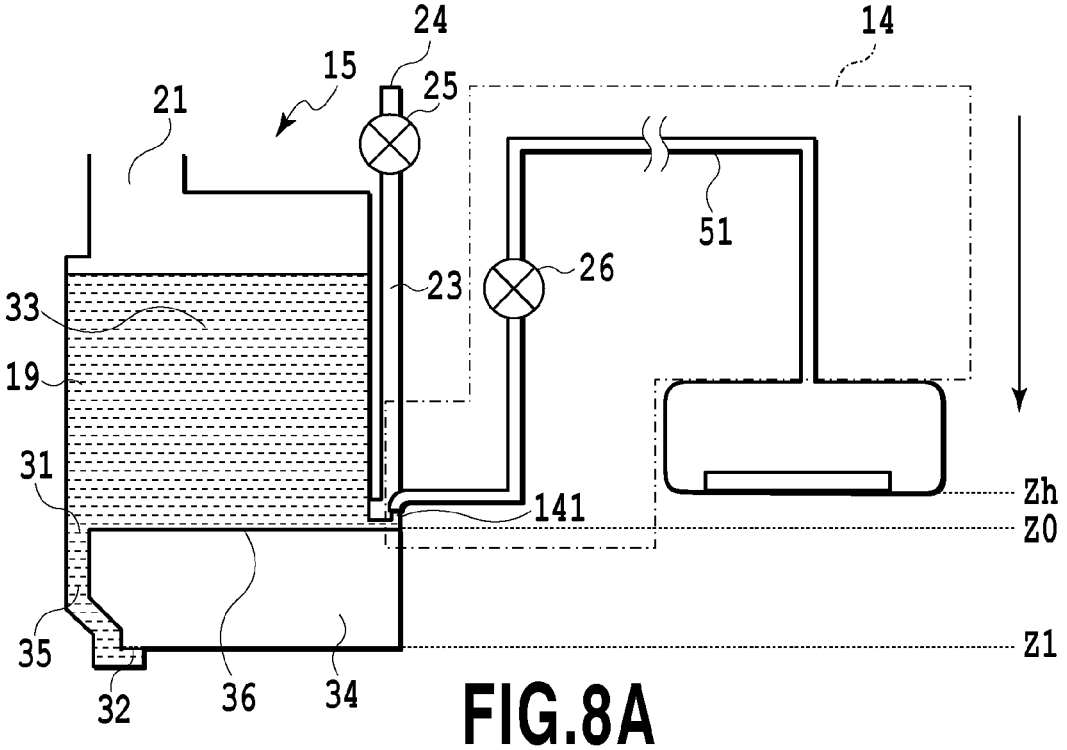
FIG. 8A is a section view showing an ink-filled state in the printing apparatus of the second embodiment.
Figure 8B:
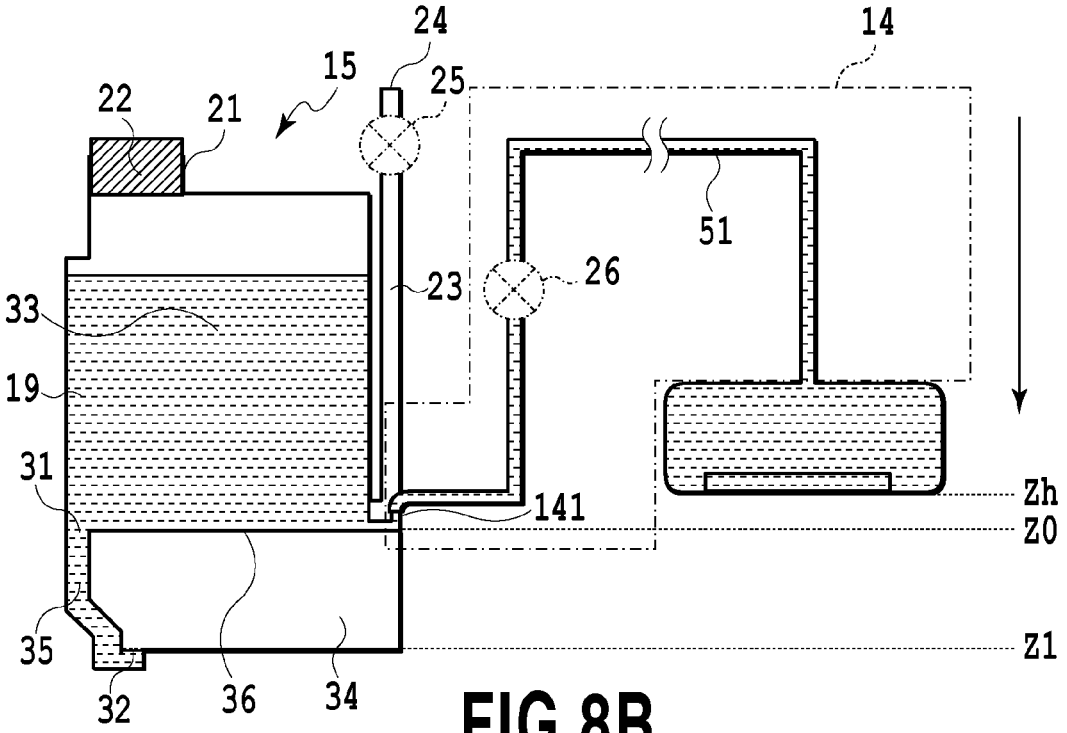
FIG. 8B is a section view showing the ink-filled state in the printing apparatus of the second embodiment.

FIG. 8A and FIG. 8B are each a schematic section view showing an ink-filled state of the ink tank 15 and the print head 13 in the printing apparatus 11 of the present embodiment.

FIG. 8A shows a state where ink is injected into the ink storage chamber 33. That is, in the present embodiment, it is possible to inject ink in the posture (first posture) shown in FIG. 8A. In the present embodiment, at the time of ink injection, the valves 25 and 26 are closed and ink is injected through the ink injection port 21. The ink 19 stored in the ink storage chamber 33 does not flow out into the buffer space located ahead of the opening 32.

FIG. 8B shows a state where the valves 25 and 26 are opened after ink is injected into the ink tank 15 and the tank cap 22 is attached. After the valves 25 and 26 are opened, the ink stored in the ink storage chamber 33 fills the print head 13 through the ink flow path 14. As described above, in the printing apparatus 11 of the present embodiment, because the valves 25 and 26 are provided, it is possible to inject ink into the ink tank 15 also in the posture (first posture) at the time in use without the need to detach the ink tank 15 from the printing apparatus 11.

As explained above, according to the printing apparatus 11 of the present embodiment, the effect that it is possible to provide a printing apparatus with good operability is obtained in addition to the effect by the first embodiment.

Third Embodiment

Figure 9A:
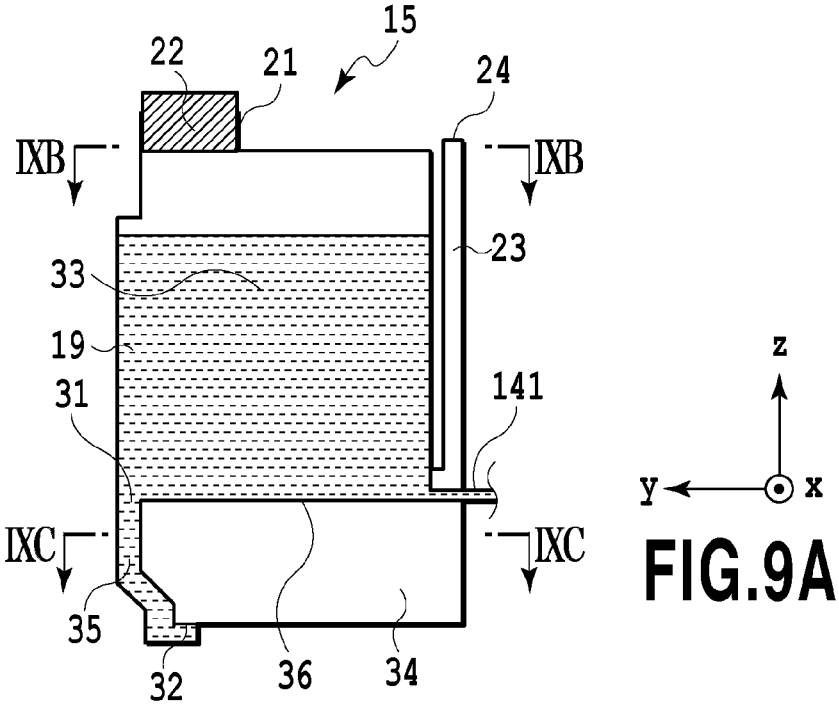
FIG. 9A is a schematic diagram showing a section of an ink tank in a third embodiment.
Figure 9B:
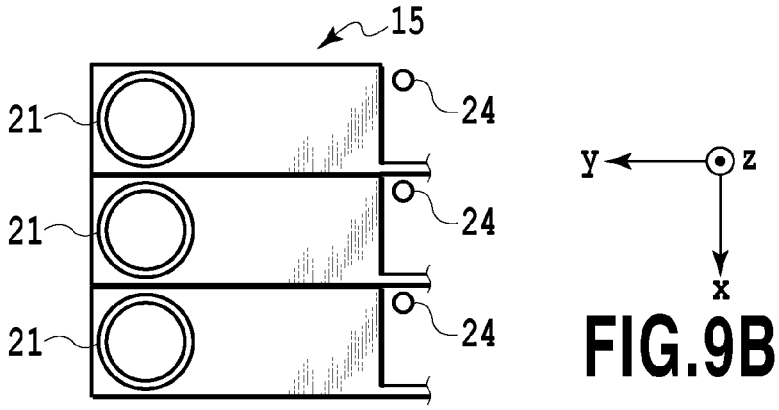
FIG. 9B is a section view along IXB-IXB line of the ink tank in the embodiment.
Figure 9C:
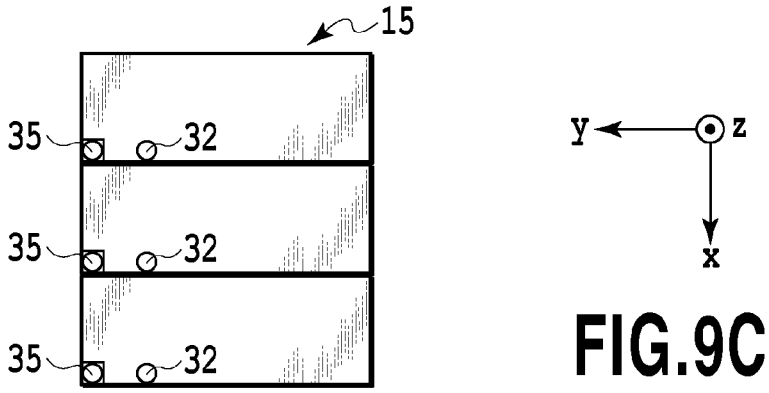
FIG. 9C is a section view along IXC-IXC line of the ink tank in the embodiment.

FIG. 9A to FIG. 9C are each a schematic diagram showing a section of the ink tank 15 in the present embodiment. FIG. 9A shows a section of the ink tank 15 in the first posture state and FIG. 9B and FIG. 9C show a section view along IXB-IXB line in FIG. 9A and a section view along IXC-IXC line in FIG. 9A, respectively. In explanation of the present embodiment, the same symbols are attached to the same configurations as those of the above-described embodiments and explanation of the duplicated contents is omitted.

In the above-described embodiments, the aspect is explained in which the ink tank 15 stores one kind of ink in the one ink storage chamber 33 and in the one buffer space 34. However, the embodiments are not limited to those described above.

That is, as shown in FIG. 9B and FIG. 9C, the ink tank 15 of the present embodiment has a plurality of ink storage chambers each storing each of a plurality of kinds of ink and a plurality of the buffer spaces 34 each corresponding to each of the plurality of ink storage chambers. Due to the configuration such as this, it is made possible to store a plurality of kinds of ink in the one ink tank 15, and therefore, it is possible to provide an ink tank and a printing apparatus with good operability while further downsizing the printing apparatus 11.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the printing apparatus of the present invention, it is possible to suppress ink from leaking out to the outside at the time of ink injection in a configuration in which an injection port is provided to an ink tank.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-214358, filed Oct. 30, 2015, which is hereby incorporated by reference wherein in its entirety.

What is claimed is:

[1. A printing apparatus comprising:

a print head having an ejection port surface on which an ejection port which ejects a liquid is formed; and a liquid storage container including:

a liquid storage chamber configured to store the liquid to be supplied to the print head;

a liquid injection portion configured for injection of the liquid into the liquid storage chamber from the outside;

an atmosphere communication chamber configured to communicate with the atmosphere, the atmosphere communication chamber being arranged under the liquid storage chamber in a direction of gravity; and a communication flow path configured to allow communication between the liquid storage chamber and the atmosphere communication chamber, the communication flow path having an opening in the atmosphere communication chamber, the opening being arranged under the ejection port surface in the direction of gravity.]

[2. The printing apparatus according to claim 1, further comprising:

a liquid supply path that connects the liquid storage chamber and the print head;

a second valve provided on the liquid supply path and configured to switch a second open state in which the liquid is supplied to the print head from the liquid storage chamber and a second closed state in which the liquid is not supplied to the print head from the liquid storage chamber.]

[3. The printing apparatus according to claim 2, wherein the second valve is in the second closed state when the liquid is injected into the liquid storage chamber from the liquid injection portion.]

[4. The printing apparatus according to claim 1,
wherein the liquid storage container further includes an atmosphere communication flow path that is connected to the atmosphere communication chamber and an atmosphere opening that opens into the atmosphere, and
the printing apparatus further comprising a first valve provided on the atmosphere communication flow path and configured to switch a first open state in which the atmosphere communication chamber communicates with the atmosphere through the atmosphere opening and a first closed state in which the atmosphere communication chamber does not communicate with the atmosphere.]

[5. The printing apparatus according to claim 4,
wherein the first valve is in the first closed state when the liquid is injected into the liquid storage chamber from the liquid injection portion.]

[6. The printing apparatus according to claim 4,
wherein the atmosphere opening is arranged in the vicinity of a top of the liquid storage container.]

[7. The printing apparatus according to claim 1,
wherein one end of the communication flow path is connected to a bottom surface side of the liquid storage chamber and the other end is connected to a bottom surface side of the atmosphere communication chamber.]

[8. The printing apparatus according to claim 1,
wherein the liquid storage container is installed in the printing apparatus.]

[9. The printing apparatus according to claim 1,
wherein the liquid storage chamber and the atmosphere communication chamber are formed by being defined by a partition wall arranged within the liquid storage container.]

[10. The printing apparatus according to claim 1,
wherein the opening in the atmosphere communication chamber of the communication flow path is formed on a bottom surface side of the atmosphere communication chamber, and
a bottom surface of the atmosphere communication chamber is arranged so as to be under an ejection port surface on which an ejection port through which the liquid is ejected is formed in the print head.]

[11. The printing apparatus according to claim 1,
wherein the storage container has a liquid supply portion from which the liquid in the liquid storage chamber is supplied to the print head, and
the liquid supply portion is located on a lower side of the liquid storage container.]

[12. The printing apparatus according to claim 11,
wherein a bottom surface of the atmosphere communication chamber is arranged so as to be under the lowest position of a flow path that connects the liquid supply portion and the print head.]

[13. The printing apparatus according to claim 1,
wherein a top surface of the atmosphere communication chamber is arranged under the ejection port surface in the direction of gravity.]

[14. The printing apparatus according to claim 1,
wherein the liquid injection portion is arranged above the ejection port surface in the direction of gravity.]

[15. A liquid storage container comprising:
a liquid storage chamber configured to store a liquid to be supplied to a print head of the printing apparatus;
a liquid injection portion configured for injection of the liquid into the liquid storage chamber from the outside;
an atmosphere communication chamber configured to communicate with the atmosphere, the atmosphere communication chamber being arranged under the liquid storage chamber in a direction of gravity; and
a communication flow path configured to allow communication between the liquid storage chamber and the atmosphere communication chamber, the communication flow path having an opening in the atmosphere communication chamber, the opening being arranged under an ejection port surface of the print head in the direction of gravity.]

[16. A printing apparatus comprising:
a print head having an ejection port surface on which an ejection port which ejects a liquid is formed;
a liquid storage container including:
a liquid storage chamber configured to store the liquid to be supplied to the print head;
a liquid injection portion configured for injection of the liquid into the liquid storage chamber from the outside;
an atmosphere communication chamber configured to communicate with the atmosphere, the atmosphere communication chamber being arranged under the liquid storage chamber in a direction of gravity;
a communication flow path having an opening in the atmosphere communication chamber and configured to allow communication between the liquid storage chamber and the atmosphere communication chamber, the opening being arranged under the ejection port surface in the direction of gravity; and
an atmosphere communication flow path that is connected to the atmosphere communication chamber and an atmosphere opening that opens into the atmosphere; and
wherein the printing apparatus further comprises a first valve provided on the atmosphere communication flow path and configured to switch a first open state in which the atmosphere communication chamber communicates with the atmosphere through the atmosphere opening and a first closed state in which the atmosphere communication chamber does not communicate with the atmosphere.]

[17. The printing apparatus according to claim 16,
wherein the first valve is in the first closed state when the liquid is injected into the liquid storage chamber from the liquid injection portion.]

[18. The printing apparatus according to claim 16, further comprising:
a liquid supply path that connects the liquid storage chamber and the print head;
a second valve provided on the liquid supply path and configured to switch a second open state in which the liquid is supplied to the print head from the liquid storage chamber and a second closed state in which the liquid is not supplied to the print head from the liquid storage chamber.]

[19. The printing apparatus according to claim 18,
wherein the second valve is in the second closed state when the liquid is injected into the liquid storage chamber from the liquid injection portion.]

[20. The printing apparatus according to claim 16,
wherein one end of the communication flow path is connected to a bottom surface side of the liquid storage chamber and the other end is connected to a bottom surface side of the atmosphere communication chamber.]

[21. The printing apparatus according to claim 16, wherein the liquid storage container is installed in the printing apparatus.]

[22. The printing apparatus according to claim 16, wherein the storage container has a liquid supply portion from which the liquid in the liquid storage chamber is supplied to the print head, and the liquid supply portion is located on a lower side of the liquid storage container.]

[23. The printing apparatus according to claim 16, wherein a top surface of the atmosphere communication chamber is arranged under the ejection port surface in the direction of gravity.]

[24. The printing apparatus according to claim 16, wherein the liquid injection portion is arranged above the ejection port surface in the direction of gravity.]

*25. A printing apparatus comprising:*

*a liquid storage container including:*

*a liquid storage chamber that stores a liquid to be supplied to a print head that ejects the liquid; and*

*an injection portion configured to inject the liquid into the liquid storage chamber;*

*a cap that can open and close the injection portion;*

*an ejection portion that is located at a front side of the printing apparatus, and configured to eject a storge medium printed by the print head to outside of the printing apparatus; and*

*a cover that can cover a top and a front side of the injection portion and can open and close,*

*wherein*

*the print head performs a printing operation,*

*the injection portion is provided on an inclined surface of the liquid storage container and is oriented toward an upper side in a case where the liquid is ejected from the print head,*

*the inclined surface is positioned so as to face the front side of the printing apparatus;*

*the cover, in a case where the liquid is injected from the injection portion into the liquid storage container, is evacuated from the top and a side of the injection portion, and*

*the cap has a protrusion that protrudes toward an outside in a state where the injection portion is hermetically closed and that is provided at an opening center of the injection portion,*

*wherein the print head can eject a magenta ink, a yellow ink and a cyan ink as the color ink,*

*wherein the liquid storage container is independently provided for each color of the liquids of colors, and*

*wherein the cover is a single cover that covers the plurality of liquid storage containers.*

*26. The printing apparatus according to claim 25, wherein the liquid storage container is arranged on a front side of the printing apparatus.*

*27. The printing apparatus according to claim 26, wherein an index indicating an amount of the liquid in the liquid storage chamber is formed on a front side in a longitudinal direction of the liquid storage container.*

*28. The printing apparatus according to claim 25, wherein the print head and the liquid storage container are connected by a tube.*

*29. The printing apparatus according to claim 28, wherein a flow part that the tube is connected to is formed around a bottom surface of the liquid storage container.*

*30. The printing apparatus according to claim 28, wherein*

*the liquid storage container includes:*

*a first chamber different from the liquid storage container; and*

*an opening through which the liquid storage container and the first chamber communicate with each other; and*

*an outlet portion to which the tube is connected is provided above the opening in the gravity direction.*

*31. The printing apparatus according to claim 25, wherein the print head can eject a black ink and a color ink.*

*32. The printing apparatus according to claim 25, wherein an atmosphere opening configured to take air into the liquid storage container is formed on a top side of the liquid storage container.*

*33. The printing apparatus according to claim 25, wherein the print head can eject the liquids of colors, the liquid storage container is independently provided for each color of the liquids of colors.*

*34. The printing apparatus according to claim 33, wherein the liquid storage container for at least one color of the liquid storage containers for the colors is different in size.*

*35. The printing apparatus according to claim 34, wherein the print head can inject a black ink and a color ink, and*

*the size of the liquid storage container of the black ink is bigger than the size of the liquid storage container of the color ink.*

*36. The printing apparatus according to claim 33, wherein a plurality of the liquid storage containers are provided side by side next to each other.*

*37. The printing apparatus according to claim 26, further comprising*

*a window, the window being provided so that the liquid in the liquid storage container is visible from an exterior of the printing apparatus.*

* * * * *